CORRECTIVE NETWORK FOR SERVOSYSTEMS

Filed April 20, 1966

3 Sheets-Sheet 1

INVENTOR
Pierre Faye

Karl F. Ross
Attorney

Oct. 6, 1970 P. FAYE 3,532,997

CORRECTIVE NETWORK FOR SERVOSYSTEMS

Filed April 20, 1966 3 Sheets-Sheet 2

INVENTOR
Pierre Faye

Karl G. Ross
Attorney

Oct. 6, 1970 P. FAYE 3,532,997

CORRECTIVE NETWORK FOR SERVOSYSTEMS

Filed April 20, 1966 3 Sheets-Sheet 3

INVENTOR
Pierre Faye

Karl G. Ross
Attorney 3,532,997

CORRECTIVE NETWORK FOR SERVO-SYSTEMS

Pierre Faye, Ormesson-sur-Marne, France, assignor to Societe Nouvelle d'Electronique et de la Radio-Industrie, Paris, France, a corporation of France Filed Apr. 20, 1966, Ser. No. 543,924
Claims priority, application France, Apr. 30, 1965, 15,368
Int. Cl. H03b 3/04
U.S. Cl. 328—155 5 Claims

ABSTRACT OF THE DISCLOSURE

Corrective network inserted between a source of amplitude-modulated carrier waves and a load, such as a servo-system responsive to the modulating signal, for selective control of attenuation and phase shifts over the range of signal frequencies to maintain stability; the network comprises a resistive series arm and a shunt arm having two capacitors alternately connectable in series with a common resistor, the switchover between these capacitors occurring in the rhythm of the incoming carrier frequency to produce an output oscillation of the same carrier frequency amplitude-modulated by the original signal with corrected frequency response.

This invention relates to transfer or corrective networks of the type used in servo-systems in order to modify the transmission characteristics of the direct and/or feedback signal channels thereof in such a way as to ensure that the system will remain stable over a desired broad frequency band while still retaining adequate accuracy and sensitivity.

A widely used type of corrective network, usually inserted in the direct signal path of a servo-system, comprises a shunt circuit branch including capacitance and resistance in series. Such a network is characterized by the fact that its gain/frequency response curve presents a sloping high-attenuation section within a frequency band which is determined by the network constants. Within the same frequency band, the phase/frequency response of the network exhibits a negative "hump," i.e., the network introduces phase lag. The insertion of such a network in the direct signal chain or forward path of a servo-system will enable the system to satisfy the stability criterion over the operating frequency range while increasing the accuracy of the system.

Conventional corrective networks will accept variable D-C signals, and if an amplitude-modulated alternating signal is applied to the network the latter will tend to treat the carrier-frequency component of the input signal as though it were the signal to be corrected, and will not have any useful action in regard to the amplitude-modulating component, or envelope, of the input signal. In servo-systems using amplitude modulation, which constitute an important and advantageous class of servo-system, this has introduced a serious difficulty. It has generally been necessary first to demodulate the amplitude-modulated input signal, pass the demodulated (intelligence, component through the D-C corrective network, and then apply the thus-corrected intelligence component to remodulate a carrier usually at the same frequency as that of the initial input signal. The demodulator and modulator involved in this sequence of steps are relatively complicated devices, since they must be so designed as to preserve the phase, in addition to the amplitude, of the input signal.

It is an object of the invention to provide improved transfer networks, of the class including a parallel-connected network branch having capacitance and resistance in series therein (such as a so-called integral network), which shall accept amplitude-modulated signals and directly process the modulating (intelligence) component thereof in accordance with the prescribed transfer function of the network. In other words, the improved networks are to exhibit the specified corrective transfer function in regard to the envelope of an amplitude-modulated signal fed thereto, rather than in regard to the carrier component of the signal. A more particular object is to provide an "envelope-transfer" network of this class whose performance will be strictly independent of the frequency of the applied signal. A further object is to provide an envelope-transfer network that is simple, economical and compact, utilizing standard circuit elements all or most of which can be embodied in integrated circuit devices, thereby greatly increasing the simplicity, economy and compactness of amplitude-modulation servo-systems in which the networks may be incorporated as compared to similar systems utilizing conventional corrective networks involving the demodulating-remodulating sequence heretofore required.

Exemplary embodiments of the invention will now be described with reference to the accompanying drawing, wherein:

FIG. 1 shows a conventional transfer network of the so-called integral type to which the invention relates;

FIGS. 1*a* and 1*b* respectively show the gain/frequency and the phase/frequency response curves of the network of FIG. 1;

Figure 1:
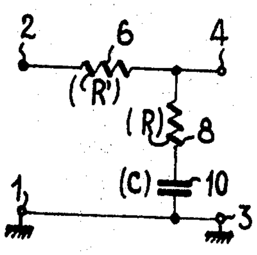

The conventional integral network shown in FIG. 1, widely used as a corrective network in servo-systems, has a pair of input terminals 1 and 2 and a pair of output terminals 3 and 4, terminals 1 and 3 being shown grounded. Input terminal 2 is connected to output terminal 4 through a series resistor 6, and output terminal 4 is connected to the common ground through a parallel reactive branch including a resistor 8 and a capacitor 10 in series.

Figures 1A, 1B:
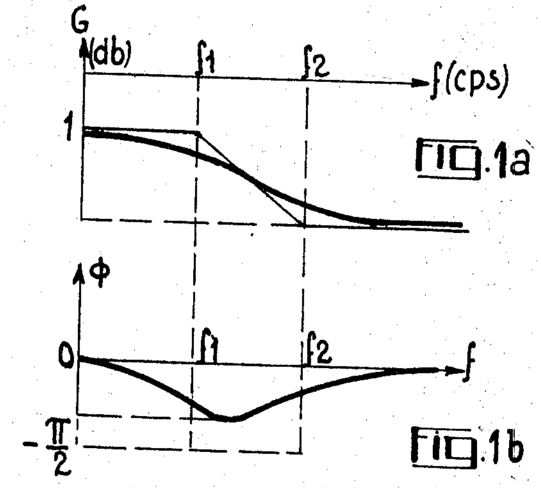

When an input voltage signal $e_1$, in the form of a variable D-C voltage, is applied across the input terminals 1 and 2, the network produces an output voltage signal $e_o$ whose amplitude gain and phase-shift angle, with reference to the amplitude and phase of the input signal, both vary with the frequency of the input signal. The variations of gain ($g$) and phase shift ($\phi$) as a function of input-signal frequency ($f$) are illustrated in FIGS. 1*a* and 1*b*, respectively. It will be seen that the gain asymptotically equals 1 for low frequencies (which is evident since capacitor 10 has infinite impedance to D.C), and equals the value $R/(R+R')$, where R and R′ are the respective resistances of resistors 8 and 6, for high frequencies. The transition from one asymptotic branch of the gain curve to the other asymptotic branch is effected in the high-slope attenuation region from frequency $f_1$ to $f_2$, which are respectively equal to $1/RC$ and $1/(R+R')C$. As to the phase-shift angle $\phi$, this is seen to be zero for low and high frequencies, with a negative hump in the mid-region between the aforementioned frequency values $f_1$ and $f_2$, where the phase shift assumes a substantial negative value, i.e., the output signal lags with respect to the input signal.

Corrective networks of the type shown in FIG. 1 are widely used in servo-mechanisms. Such a network may, for example, be inserted in the forward or direct signal channel of the system to introduce an additional phase lag into the error signal and thereby ensure that the system will satisfy the stability criterion throughout the entire frequency band of interest. The network may also be introduced into the feedback signal path, in which case it would result in an effective phase lead (positive phase shift) of the output signal of the system.

The integral network of FIG. 1 is known to have the following transfer function:

$$F(p)=K\frac{1+RCp}{1+(R+R')Cp} \qquad (1)$$

where $p$ stands for the imaginary variable $p=wj$ or $2\pi fj$, $f$ being the input frequency and $j$ the imaginary unit vector. As is well known, the transfer function $F(p)$ represents a complex quantity whose modulus is the gain $G(p)$ and whose argument is the phase shift $\phi(p)$. It is thus apparent that the transfer function $F(p)$ provides in itself a complete description of the frequency response of the network, yielding a full knowledge of both the gain and phase shift characteristics of FIGS. 1*a* and 1*b*.

The transfer function (1) can be rewritten in the form $$F(p)=K\frac{1+\tau_1 P}{1+\tau_2 P} \qquad (2)$$

where $\tau_1$ and $\tau_2$ represent the low-frequency and high-frequency time constants, RC and $(R+R')C$, respectively.

Figure 2:
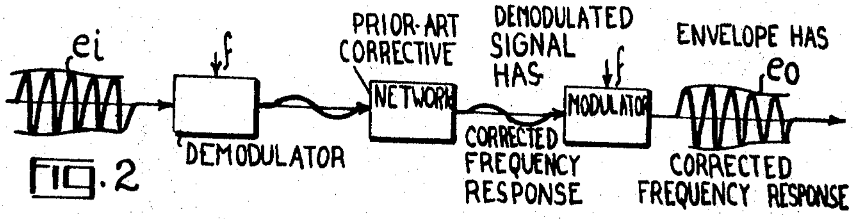
FIG. 2 is a block diagram illustrating the sequence of steps heretofore required to be performed when the conventional network of FIG. 1 was used to process an amplitude-modulated signal.

If it is desired to use the network of FIG. 1 in a system wherein the intelligence signal is conveyed in the form of amplitude modulation on a carrier frequency, it is not possible to apply the input signal directly to the network, since the network would operate to modify the gain and phase responses of the carrier, not the gain and phase responses of the envelope that constitutes the useful intelligence. In such cases, therefore, it has heretofore generally been necessary to use the scheme depicted in FIG. 2. The amplitude-modulated input signal $e_i$ is there shown applied to a demodulator. The demodulated intelligence component is then applied to the corrective network of FIG. 1, and the output signal from the network is applied to the modulating input of a modulator receiving at its "moduland" input the same frequency $f$ as that of the input carrier, in order to reconstruct an output signal $e_o$ which is similar to the input signal except that the modulating component (or envelope) thereof has its gain/and phase/frequency responses modified in accordance with the response curves of FIGS. 1*a* and 1*b*, as required for system stability.

Figure 3:
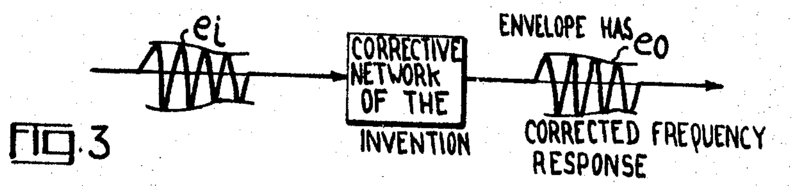
FIG. 3 is a similar diagram illustrating the use of an envelope-transfer network according to the invention under similar circumstances.

The invention, in contrast, provides an "envelope transfer" network that is adapted to handle directly the amplitude-modulating component of a modulated input signal, in order to modify the gain and phase characteristics of said modulating component in accordance with response curves similar to those shown in FIGS. 1*a* and 1*b*. This is illustrated in FIG. 3, where the amplitude-modulated input signal $e_i$ is shown fed direct to an envelope-corrective network according to the invention (later described), and the output signal from the network appears as an amplitude-modulated signal of the same frequency as the input carrier freqquency but having a modulation component, or envelope, with gain/and phase/frequency responses modified as described above, for stability of the system.

Figure 4:
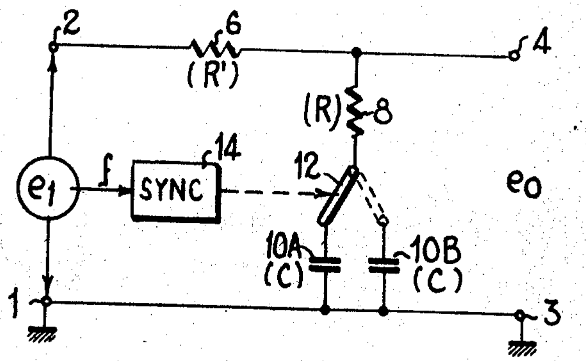
FIG. 4 is a diagrammatic or equivalent representation of an envelope-transfer network according to the invention.

The basic principle of the invention as applied to a transfer network of this general type, i.e., one having a transfer function of a form similar to that of the conventional network of FIG. 1, is illutarated in FIG. 4. It will be seen that the improved network differs from that in FIG. 1 in that it includes two capacitors 10A and 10B in place of the single capacitor 10, and that means are provided, herein symbolically presented by a switch 12, for cutting the two capacitors in and out of circuit alternately. Synchronizing means are further provided, schematically indicated as a box 14, for actuating the switching means 12 in synchronism with the carrier frequency $f$ of the input signal, so that each of the two capacitors is enabled during a respective one of the two alternating series of unidirectional pulses of the input carrier frequency. For example, capacitor 10A may be in circuit during all the positive half-cycles of the input carrier frequency and capacitor 10B in circuit during all of the negative half-cycles.

The remarkable fact has been established, and a mathematical demonstration thereof will be given later, that with the basically simple circuit arrangement shown in FIG. 4 an amplitude-modulated signal $e_i$ applied to the input terminals 1–2 will be converted by the network into an output signal $e_o$ which: (I) has the same carrier frequency as the input signal and (II) has an envelope whose gain/ and phase/frequency responses are modified with respect to the gain/ and phase/frequency responses of the envelope of the input signal in accordance with a transfer function that is of the same general form as the transfer function of the static network of FIG. 1, indicated by Equation 2 above.

It may already be noted at this point, however, that while the envelope-transfer function of the network of FIG. 4 is of the same form as the transfer function of the conventional network of FIG. 1, the constant coefficients entering into the function are wholly different.

Before giving mathematical proof of the above statements, a practical embodiment of the network of FIG. 4 will be described with reference to FIG. 5.

Figure 5:
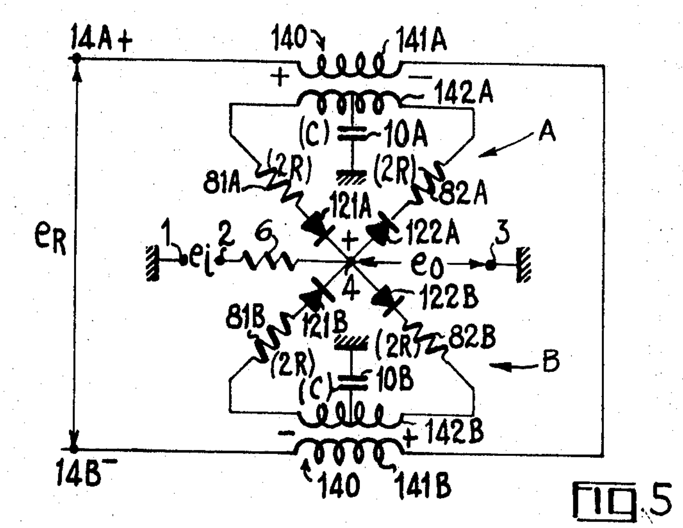
FIG. 5 is a circuit diagram of a practical embodiment of the envelope-transfer network.

The network of FIG. 5 has the input terminals 1–2 and the output terminals 3–4, terminals 1 and 3 being grounded. Input terminal 2 is connected to output terminal 4 through the series resistors 6 (as in FIGS. 1 and 4). Connected to output terminal 4 are two similar parallel circuit branches generally designated A and B, having their other ends connected to the common-return or grounded terminal 1–3. Each circuit branch A and B is composed in turn of two similar parallel lines. Thus circuit branch A includes two diodes 121A and 122A, connected in reversely poled relation with terminal 4, and two resistors 81A and 82A having respective ends connected to the free poles of the diodes and other ends connected to respective ends of a winding 142A. Circuit branch B is similarly arranged and its parts as designated with the same numerals followed by letter B.

Windings 142A and 142B constitute the series-connected parts of the secondary winding of a transformer generally designated 140. The primary winding of this transformer comprises two series-connected winding sections 141A and 141B inductively coupled to the secondaries 142A and 142B respectively. The free terminals 14A and 14B of the transformer primary winding are connected to an A-C voltage source delivering a reference voltage $e_R$ which is synchronous with the carrier frequency $f$ of the input signal $e_i$, being an oscillation of the same frequency and of either the same or the opposite phase as said carrier frequency. The reference voltage $e_R$ has an amplitude greater than the maximum amplitude of the input signal.

Figure 5A:
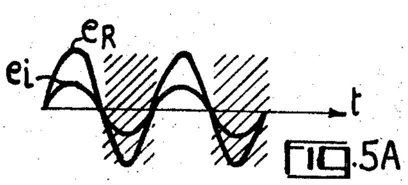
FIGS. 5*a* and 5*b* are waveform diagrams which are of assistance in understanding the operation of the network.
Figure 5B:
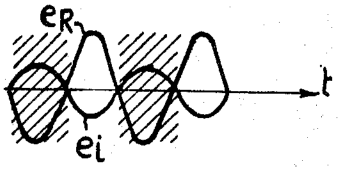

In the operation of the circuit, it may be assumed that during those semicycles of the input carrier frequency when input terminal 2 is positive relative to grounded terminal 1 as indicated by the plus sign, reference terminal 14A is positive and 14B is negative, as indicated by the plus and minus signs. The ends of the primary winding sections 141A and 141B then have the relative polarities indicated by the plus and minus signs, and the secondary winding sections 142A and 142B assume corresponding polarities. During the half-cycles considered, therefore, it will be seen that diodes 121A and 122A permit signal-current flow around circuit branch A whereas diodes 121B and 122B prevent signal-current flow around circuit branch B. Hence, during the carrier half-cycles referred to, the input signal voltage $e_i$ is permitted to flow through the parallel resistors 81A–82A and through capacitor 10A in series therewith to ground. Similarly, during the remaining carrier half-cycles when input terminal 2 is negative and the reference-source terminals 14A and 14B are respectively negative and positive, the input signal voltage is allowed to flow only around the B circuit, through the parallel resistors 81B–82B and capacitor 10B in series therewith to ground. The operation is clarified by the waveform diagrams shown in FIGS. 5A and 5B, believed to be self-explanatory.

It will therefore be apparent that the circuit shown in FIG. 5 is equivalent in its operation to the basic equivalent circuit described with reference to FIG. 4, with the diodes 121A through 122B performing the function of switch 12, and the transformer 140 connected to the reference voltage source serving as the synchronizing device called 14 in the basic diagram.

It will also be noted that in the practical circuit of FIG. 5 each pair of parallel resistors such as 81A–82A corresponds in effective value to the single resistor 8 in FIG. 4, and each of the four resistors in FIG. 5 should therefore be regarded as having a resistance of 2R if R is the resistance of resistor 8 in FIG. 4.

It will now be demonstrated that the dynamic transfer network of the invention as described above operates in the manner earlier stated to modify the envelope of the amplitude-modulated input signal in accordance with the prescribed transfer function.

Figure 6:
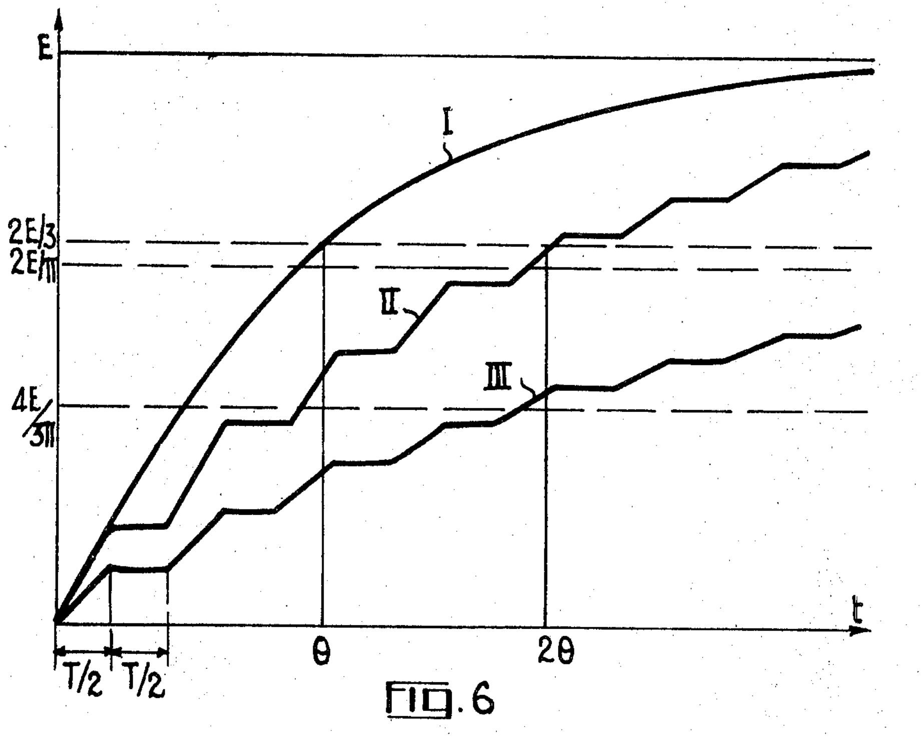
FIG. 6 is a graph explaining the charging process of a capacitance in the network of the invention.

As a preliminary step, we shall examine in detail the charging cycle of each of the capacitors 10A and 10B. In FIG. 6, curve I is the usual logarithmic charge curve of a capacitor having a voltage of magnitude E continuously applied across it, as would be the case for the single capacitor 10 in FIG. 1. The full charge E is attained asymptotically in such a way that two thirds of the peak value, 2E/3, are attained in the time $\theta=(R+R')C$, the time constant of the network of FIG. 1. Considering now either of the two capacitors 10A or 10B in a network according to the invention, it will be understood that an incremental charge is added to the capacitor during every other half-cycle of the input voltage and that during the other, alternate half cycles the charge is retained substantially constant since the capacitor is isolated; during these latter half-cycles, the other capacitor is taking on an incremental charge of reverse polarity. It is easily established analytically that under these conditions, and assuming first for simplicity that the input voltage is square-wave rather than sinusoidal, the charge will follow a stepped curve as indicated at (II), wherein the peak value is the same as before, but the rise is twice as slow as in curve (I), so that the value $2E/3$ is attained only in the time $2\theta$. When the input voltage is sinusoidal rather that square-wave, it is found that the final charge asymptotically attained is reduced from the previous value E to $2E/\pi$, with the two-thirds of this peak value, $4E/3\pi$, being again attained in the time $2\theta$.

In a network according to the invention, therefore, assuming sinusoidal input frequency as is usually the case, the applicable charge curve is curve (III). It should be noted that in FIG. 6 the time constant $\theta$ has for clarity been shown only a few times greater than the cycle period T of the input frequency. Actually it would be many times greater. The small surge voltages present at the start of each step, following a charge increment, are actually negligibly low.

The two important results of the above discussion are, first, that under steady-state conditions, i.e., when the amplitude of the sinusoidal input signal is unchanging, each capacitor of the network carries a voltage that is $2/\pi$ times the amplitude of the input signal; and, second, that with either of the capacitors in circuit, the network has an "apparent" time constant of $2\theta$. This latter statement means that any disturbance or variation in the modulating component or envelope of the input signal will appear across the capacitor with a time lag of $$2\theta=2(R+R')C$$

The above two results will now be applied in order to establish, first, the waveform of the carrier component in the output signal $e_o$ of the network of FIG. 4 or 5 and, second, the transfer function of the network with respect to the modulating component or envelope of the input signal.

The following relation is immediately apparent from an inspection of either FIG. 1 or FIG. 4 upon considering that the voltage rises cancel the voltage drops over the network:

$$e_O=\frac{R}{R+R'}e_i+\frac{R'}{R+R'}V \qquad (3)$$

where V is the voltage across the capacitor in circuit.

The above equation holds both for the instantaneous value of the carrier component of the signals and, with certain reservations later indicated, for the integrated envelope or modulating component.

Applying the equation to the instantaneous carrier values, $e_i$ represents the sinusoidal input carrier component, hence $e_i=E_i \sin wt$; and V represents the capacitor charge in the steady state, that is $\pm 2E_i/\pi$ as explained with reference to curve III of FIG. 6. The output signal $e_o$, which in this case represents the output carrier component, is therefore $$e_O=\frac{R}{R+R'}E_i \sin wt+\frac{R'}{R+R'}\epsilon\left(\frac{2E}{\pi}\right) \qquad (4)$$

where the function $$\epsilon\left(\frac{2E}{\pi}\right)$$

has the value $+2E/\pi$ for $0<wt<T/2$ and the value $-2E/\pi$ for $T/2<wt<T$.

Figure 7:
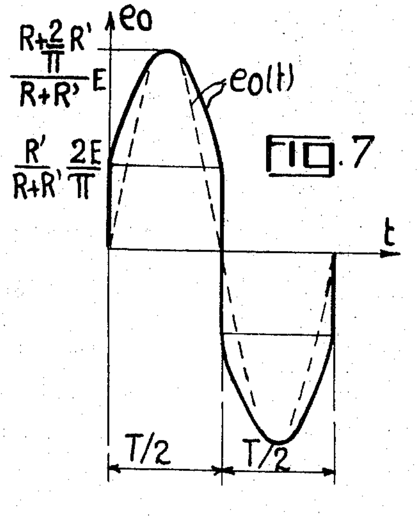
FIG. 7 shows the waveform of the carrier in the output signal from a network according to FIG. 5.

The resulting waveform for the output-signal carrier is shown in FIG. 7 as composed, in each half-cycle of the input-carrier frequency, of a rectangular "pedestal" representing the steady-state capacitor voltage, surmounted by a semi-sinusoid produced by the input carrier. The crest value of the composite signal is immediately derivable from the Equation 4 as being $$E_O=\left(\frac{R}{R+R'}+\frac{2}{\pi}\cdot\frac{R'}{R+R'}\right)E_i \qquad (5)$$

as indicated in the figure. This composite output carrier has a fundamental component which is the sinusoid shown in dashed lines. The actual output carrier approximates this fundamental sinewave very closely, especially since the switching action is not instantaneous, so that the sides of the "pedestal" voltage, here shown vertical, actually converge towards the apices. Further, in most real servomechanisms the harmonics would be eliminated, as in the 90°-phaseshift capacitor of a two-phase induction servo. It is justifiable, therefore, to assimilate the carrier waveform of the output signal with a sinewave of a frequency equal to that of the input carrier.

The above has demonstrated statement (I) concerning the carrier component of the output signal from the network of the invention. There now remains to verify statement (II) concerning the transfer function of the network in respect to the modulating component or envelope of the input signal.

Calling $A_i(t)$ and $A_0(t)$ the modulating components, or instantaneous envelope voltages, of the input and output signals, Equation 3 can be rewritten $$A_0(t)=\frac{R}{R+R'}A_i(t)+\frac{R'}{R+R'}V(t) \qquad (6)$$

Expression 6 can be rewritten as follows by Laplace transformation:

$$A_0(p)=\left[\frac{R}{R+R'}+\frac{R'}{R+R'}\cdot\frac{2}{\pi}\cdot\frac{1}{1+p\tau_2}\right]A_i(p)$$

where $A_0(p)$ and $A_i(p)$ are the Laplace transforms of the output and input voltages $A_0(t)$ and $A_i(t)$, and $$\tau_2=2(R+R')C$$

The transfer function is given by:

$$\frac{A_0(p)}{A_i(p)}=F(p) \qquad (7)$$

$$F(p)=\frac{A_0(p)}{A_i(p)}=\frac{R}{R+R'}+\frac{R'}{R+R'}\cdot\frac{2}{\pi}\cdot\frac{1}{1+p\tau_2} \qquad (8)$$

Expression 8 can be rewritten as follows:

$$F(p)=\frac{R+\frac{2}{\pi}R'}{R+R'}\;\frac{1+\frac{Rp\tau_2}{R+\frac{2}{\pi}R'}}{1+p\tau_2} \qquad (9)$$

And finally remembering that: $\tau_2=2(R+R')C$ $$F(p)=\frac{R+\frac{2}{\pi}R'}{R+R'}\;\frac{1+\frac{2R(R+R')C}{R+\frac{2}{\pi}R'}p}{1+2(R+R')Cp} \qquad (10)$$

It can be seen that expression (10) is of the same form as Expression (2) earlier given, the coefficients being identified as follows between the two formulas:

$$k=\frac{R+\frac{2}{\pi}R'}{R+R'}$$

$$\tau_1=\frac{2R(R+R')C}{R+\frac{2}{\pi}R'} \qquad (11)$$

$$\tau_2=2(R+R')C$$

It is thus vertified that the dynamic transfer network of the invention will operate on the variable envelope of an amplitude-modulated input signal to modify the gain/ and phase/frequency response of said input envelope voltage in accordance with the prescribed transfer function, i.e., with response curves similar in shape to those shown in FIGS. 1*a* and 1*b*.

It will be noted from Equations 11 that the coefficients of the transfer function, except the second time constant $\tau_2$, differ from the corresponding coefficients of the transfer function of the conventional, static, transfer network as shown by Equations 1 and 2. The important point is that all said coeffiicents depend only on the circuit constants R, R′ and C, and are independent of the carrier frequency *f*, thereby demonstrating the chief advantage of the invention. It may also be noted from Equations 11 that the network "efficiency," defined as the ratio of time constants $\tau_1/\tau_2$, is $R/(R+2R'/\pi)$, and hence is a function only of the resistance ratio $R'/R$ and can be selected arbitrarily and independently of the time constant $\tau_2$.

Figure 8:
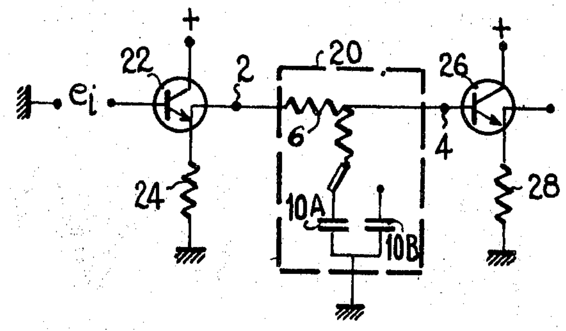
FIG. 8 illustrates the network of the invention associated with input and output decoupling and impedance-matching stages.

When coupling a corrective network according to the invention in a signal chain, such as the direct or the feedback channel of a servo-mechanism, the network may advantageously be interposed between two decoupling stages for impedance-matching purposes. A low output-impedance stage is connected ahead of the corrective network and a high input-impedance stage is connected beyond it. FIG. 8 illustrates such an arrangement, where a corrective network according to the invention, generally designated 20, is shown connected between an input and an output decoupling stage each comprising a transistor connected in a common-collector, emitter-follower circuit. The input stage comprises a transistor 22 having an input signal applied from its base, with its collector biased to positive battery and its emitter grounded through a load resistor 24 whose value is selected considerably lower than that of the input resistor 6 of corrector network 20. Similarly, the output-matching stage comprises a transistor 26 receiving the corrected signal voltage from network 20 applied to its base, the collector being biased from positive battery and its emiter being grounded through a load resistor 28 from which a low-impedance output signal is derived.

It will be observed that, in a circuit of the type shown in FIG. 8, both capacitors 10A and 10B of the corrective network operate under unidirectional potentials as determined by the potential applied to the network output terminal 4 through transistors 22 and 26 from the (here positive) biasing source. The reason is that each capacitor can only charge up to a voltage not exceeding $2/\pi$ times the maximum amplitude of of the input alternating voltage applied to terminal 2, as earlier explained; if the transistor bias is selected so as to apply to output terminal 4 a D-C potential as great as said maximum input A-C amplitude, it is seen that capacitors 10A and 10B can at no time become negative with respect to ground. This affords the advantageous possibility of using polarized chemical capacitors as the capacitors 10A and 10B in the corrective network.

Figure 9:
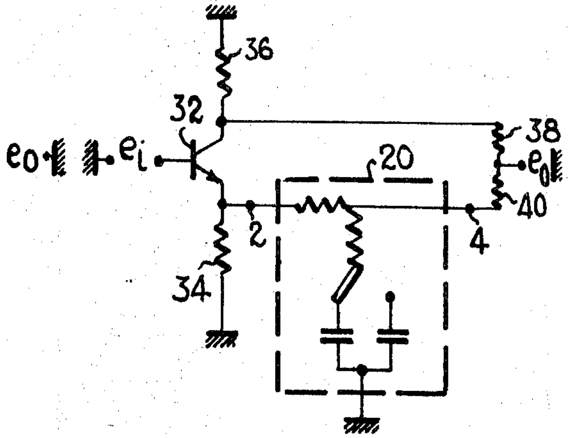
FIG. 9 shows a circuit including the improved envelope-transfer network and having a phase-lead overall characteristic.

Intrinsically the corrective circuit described above is a phase-lag circuit. This is manifest from an inspection of the coefficients of its transfer function (see Equation 10), since it is known that the phase shift through a network is positive (lead) or negative (lag) according to whether the ratio $\tau_1/\tau_2$ of the time-constant coefficients in its transfer function is greater or less than unity. The ratio, in this case, is $R/(R+2R'/\pi)$ or $1/(1+2R'/R\pi)$, which clearly is always less than one. However, the network can readily be connected in such a manner that it will, in effect, operate as a phase-lead corrective network should this be desired. A suitable circuit arrangement for this purpose is illustrated in FIG. 9.

The corrective network 20 has its input terminal 2 connected to the emitter of a transistor 32 receiving the input signal on its base. The emitter is connected through a load resistor 34 to a positive biassing potential, while the collector is grounded through a resistor 36 of equal value to resistor 34. The output signal is derived from a voltage divider comprising two resistors 38 and 40 connected between the collector of transistor 32 and the output terminal 4 of the corrective network. It is readily shown that, with this arrangement, the apparent or overall transfer function of the circuit is represented by a constant quantity minus the transfer function of network 20. Thus, the overall phase shift introduced by such a circuit will equal the constant, or zero, phaseshift thrugh transistor 32 minus the frequency-responsive phaseshift through network 20. Since this latter phaseshift is negative, the overall phaseshift is positive, i.e., a phase-lead network is in effect obtained.

It is understood that corrective networks according to the invention may be inserted both in the forward, or direct, and in the feedback signal paths of a servo-mechanism. When inserted in the forward chain, the basic network of the invention (as shown, e.g., in FIG. 1 or 4) acts as a phase-lag network, and when inserted in the feedback signal path it performs as a phase-lead network. By the same token, a network of the type shown in FIG. 9 will perform as a phase-lead network when inserted in the forward chain, and as a phase-lag network when inserted in the feedback chain of a servo-mechanism.

Figure 10:
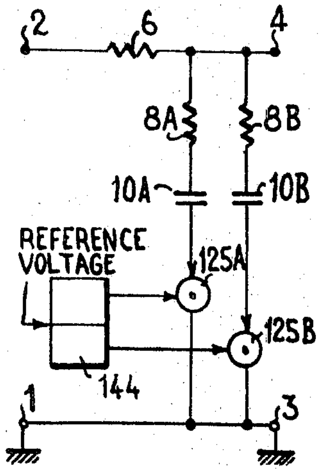
FIG. 10 illustrates a modified envelope transfer network according to the invention.

FIG. 10 illustrates by way of further example an embodiment of an envelope-transfer network according to the invention wherein digital circuitry is used for performing the switching action between the two resistance-capacitance branches. In this embodiment the network again includes the series resistor 6 connected between input terminal 2 and further output terminal 4, and includes two parallel branches connected to terminal 4 and comprising each a resistance 8A or 8B and a capacitor 10A or 10B respectively connected in series therewith. The free sides of the capacitors are connected to first inputs of respective coincidence circuits 125A and 125B having their outputs connected to common ground terminal 1–3. The gates 125A and 125B have enabling inputs connected to respective outputs of a suitable bistable circuit 144, such as a flip-flop or trigger. The bistable circuit 144 has its inputs fed with pulses derived from a reference source (not shown) at the same frequency as the carrier wave of the input signal. It will be evident that the network of FIG. 10 will operate in a manner similar to that of FIG. 5 and will exhibit the desired transfer characteristics in regard to the envelope or ampiltude-modulation component of an input signal applied to terminals 1–2, as earlier explained. The gates 125A and 125B, here shown in conventional logic form, may be of any desired construction, using diodes, transistors, tunnel diodes, or the like. Various other forms of switching means may be used. In cases where low carrier frequencies, of the order of a hundred or a few hundred cycles per second, are used, electromechanical switching means such as vibrators may well be applied.

Envelope-correcting networks according to the invention will be of great value in servo-mechanisms of the amplitude-modulation type in that their use will impart the requisite stability characteristics to the servo-system in a more efficient and a far more expedient manner than was heretofore possible. The networks are simple and economical to make, require no adjustments, are compact and can easily be made by printed- and integrated-circuit techniques. The reference-signal coupling transformer such as element 140 (FIG. 5), where used, can be of low-power and small-size type with a power rating of only one watt for all reasonable input signal values, and will not require any special shielding and insulating measures because of the low effective impedance of the parallel circuit branches of the network. Such transformer, if used, can conveniently be located at a point remote from the servo-mechanism so that the network will not appreciably increase the effective space requirements.

The networks of the invention are capable of imparting the desired transfer characteristic (Equation 2) direct to the amplitude-modulating component of the signal in a manner that is entirely independent of the carrier frequency (and phase and amplitude), a result unattained, to the best of my knowledge, by any conventional means. The constants K, $\tau_1$ and $\tau_2$ of the network, which define inter alia the frequency range of the stabilizing action imparted to the servo-mechanism, can be separately adjusted to their desired values. The time constant ratio, which defines the network efficiency, can also be independently selected. The network has no operating threshold, no static error, and is completely undisturbed by temperature variations.

What is claimed is:

1. A transfer network for the frequency-selective correction of transmission characteristics of a band of signal frequencies modulating the amplitude of a carrier wave, comprising:
- an input circuit connectable to a source of carrier oscillation amplitude-modulated by a signal variable over a predetermined frequency range;
- an output circuit connectable to a load to be controlled by said signal;
- a series impedance arm connected between said input and output circuits;
- a shunt arm connected between a point of said input circuit and a point of said series impedance arm, said shunt arm including resistance means, first and second reactance means and switch means for alternately connecting said first and second reactance means between said points in series with said resistance means; and
- control means for operating said switch means in the rhythm of said carrier oscillation, thereby connecting said first and second reactance means in circuit during positive and negative half-cycles, respectively, of said oscillation, said input circuit comprising an amplifier with a pair of balanced output terminals, said output circuit including a voltage divider connected across said output terminals, said series impedance arm being inserted in the connection between said voltage divider and one of said output terminals.

2. A network as defined in claim 1 wherein said amplifier is a transistor having an emitter, a base and a collector, said base being connected to said source of carrier oscillation, said output terminals being respectively connected to said emitter and said collector.

3. A network as defined in claim 2 wherein said series impedance arm is inserted between said voltage divider and said emitter.

4. A transfer network for the frequency-selective correction of transmission characteristics of a band of signal frequencies modulating the amplitude of a carrier wave, comprising:
- an input circuit connectable to a source of carrier oscillation amplitude-modulated by a signal variable over a predetermined frequency range;
- an output circuit connectable to a load to be controlled by said signal;
- a series impedance arm including a resistor connected between said input and output circuits;
- a shunt arm connected between a point of said input circuit and a terminal of said resistor remote from said input circuit, said shunt arm including resistance means, first and second capacitors and switch means for alternately connecting said first and second capacitors between said points in series with said resistance means, said switch means including first and second diode means in series with said first and second capacitors, respectively; and
- control means for operating said switch means in the rhythm of said carrier oscillation, thereby connecting said first and second capacitors in circuit during positive and negative half-cycles, respectively, of said oscillation, said control means including a transformer having a primary winding connected to a source of carrier frequency and having a pair of secondary windings respectively connected in series with said first and second diode means, said resistance means comprising a first pair of resistive branches connected across one of said secondary windings and a second pair of resistive branches connected across the other of said secondary windings, said first and second diode means each including two half-wave rectifiers connected with opposite polarities in the branches of a respective pair, said capacitors being respectively connected to the midpoints of said secondary windings.

5. A transfer network for the frequency-selective correction of transmission characteristics of a band of signal frequencies modulating the amplitude of a carrier wave, comprising:
- an input circuit connectable to a source of carrier oscillation amplitude-modulated by a signal variable over a predetermined frequency range;
- an output circuit connectable to a load to be controlled by said signal;
- a series impedance arm including a resistor connected between said input and output circuits;
- a shunt arm connected between a point of said input circuit and a terminal of said resistor remote from said input circuit, said shunt arm including resistance means, first and second capacitors and switch means for alternately connecting said first and second capacitors between said points in series with said resistance means, said switch means including first and second diode means in series with said first and second capacitors, respectively; and control means for operating said switch means in the rhythm of said carrier oscillation, thereby connecting said first and second capacitors in circuit during positive and negative half-cycles, respectively, of said oscillation, said control means including a transformer having a primary winding connected to a source of carrier frequency and having a pair of secondary windings respectively connected in series with said first and second diode means, said resistance means comprising a first resistive circuit connected across one of said secondary windings and a second resistive circuit connected across the other of said secondary windings, said first and second diode means being respectively inserted in said resistive circuits, said capacitors being respectively connected to the midpoints of said secondary windings.

References Cited

UNITED STATES PATENTS

| | | | |
|---|---|---|---|
| 2,584,954 | 2/1952 | Williams. | |
| 2,888,636 | 5/1959 | McManis. | |
| 3,052,857 | 9/1962 | Martin | 328—166 X |
| 3,072,854 | 1/1963 | Case | 328—155 |
| 3,329,910 | 7/1967 | Moses | 307—255 X |
| 3,348,157 | 10/1967 | Sullivan et al. | 329—50 |

DONALD D. FORRER, Primary Examiner

S. D. MILLER, Assistant Examiner

U.S. Cl. X.R.

307—295; 328—162, 165, 167; 333—70